United States Patent Office

3,177,245
Patented Apr. 6, 1965

3,177,245
DIELS-ALDER ADDUCTIONS WITH AROMATIC DI-
ENOPHILES UNDER EXOGENOUS PRESSURE
Howard L. Cheifetz, Berkeley, Walter B. Hoffman, Oakland, Julius Hyman, Piedmont, Melvin Look, El Cerrito, and James R. McLaughlin, San Francisco, Calif., assignors to Fundamental Research Company, Berkeley, Calif., a partnership
No Drawing. Filed Oct. 5, 1961, Ser. No. 143,048
7 Claims. (Cl. 260—515)

This invention relates to Diels-Alder adductions of dienes with aromatic dienophiles where an aromatic ring itself acts as the dienophile. It is concerned particularly with the Diels-Alder adductions of hexachlorocyclopentadiene with such aromatic dienophiles as, for example, naphthalene, naphthalenes substituted on but one ring, and anthracene.

A principal object of the invention is the adduction of hexachlorocyclopentadiene with aromatic dienophiles at a far more rapid rate than heretofore found possible.

Another object of the invention is a process for preparing the Diels-Alder adducts of hexachlorocyclopentadiene with aromatic dienophiles in which side reactions and the thereby resulting undesirable by-products are greatly reduced or substantially eliminated.

Still another object of the invention is the Diels-Alder adduction of hexachlorocyclopentadiene with aromatic dienophiles with which it will not normally adduct because of steric hindrance.

A still further object of the invention is a process for preparing Diels-Alder adducts which requires much smaller processing equipment and greatly reduced volumes of reactants in process, thus correspondingly decreasing the necessary capital investment for both equipment and reactants.

The attainment of these and other objects of the invention will become apparent on the further reading of this specification and the appended claims.

The Diels-Alder adduction of hexachlorocyclopentadiene, reacting as a diene, with naphthalene and anthracene, acting as dienophiles, was disclosed by Hyman and Danish in U.S. Patent No. 2,658,926. The principal adduction product of the reaction is the diadduct of two moles of hexachlorocyclopentadiene with one mole of naphthalene or anthracene. The rate of adduction is very slow. Hyman and Danish recommended operating in the range of about 120° C. to 180° C. for about 100 to 300 hours.

The yield of the diadduct of hexachlorocyclopentadiene and naphthalene (which will be referred to hereinafter for convenience as di-hex-adduct, or DHA) thus prepared was reported by Danish, Silverman and Tajima (Jour. Amer. Chem. Soc. 76, 6147 (1954)), using a 2:1 mole ratio of hexachlorocyclopentadiene and naphthalene, to be 29.6 percent in 120 hours, and 44 percent in 200 hours at 150° C. to 160° C., corresponding to only 0.25 percent and 0.22 percent per hour, respectively. The reaction is more rapid at somewhat higher temperatures, but the amount of undesired and tarry by-products increases with increasing temperature of reaction, to the detriment of the desired adduction. Furthermore, although increasing temperature increases the rate of reaction, it simultaneously shifts the reaction equilibrium away from the adduct production and toward the generators side of the equation. Thus, in practice, one cannot operate economically above about 165° C., since dehalogenation reactions begin then to compete measurably with the desired adduction, occasioning excessive loss of hexachlorocyclopentadiene and naphthalene, with resulting production of tarry naphthalene degradation products, undesired condensed ring chlorocarbons and corrosive hydrogen chloride.

The extremely slow rate of adduction in the Hyman and Danish process constitutes a major difficulty to the practice of their process on a commercial scale. As a result of the slow rate of reaction, disproportionately large quantities of the reactants must be employed and handled in the process, and oversize equipment must be installed and operated, thus greatly increasing both the required capital investment and cost of materials in process.

We have now found that the rate of Diels-Alder adduction of hexachlorocyclopentadiene with aromatic dienophiles may be very greatly increased by subjecting the adduction mixtures to super-atomospheric pressure. Our invention is not concerned with those adductions which must be carried out at super-atmospheric pressures to prevent escape by volatilization of one or more components of the reaction mixture or to maintain the reaction mixture in the liquid phase at the temperature of the reaction; rather it is concerned with liquid phase adductions which can be and heretofore have been carried out at atmospheric pressure at rates very much slower than those made possible by this invention.

Thus, for example, in the naphthalene-hexachlorocyclopentadiene adduction, at the same temperature of 150° C.–160° C. used by Danish, Silverman and Tajima in the work referred to above, but using an externally applied pressure of between 6,000 and 7,000 pounds per square inch (gauge), the yield of DHA in only 18 hours was 13.1 percent of the theoretical, or 0.73 percent per hour, compared with the 0.25 or 0.22 percent reported for the reaction at atmospheric pressure. Under the same conditions of time and temperature, but with an applied pressure of 15,000 lbs. per sq. in., the yield per hour was 1.23 percent; at 25,000 lbs. per sq. in., 2.01 percent; and at 35,000 lbs. per sq. in., 2.55 percent, or ten times the yield at atmospheric pressure.

The use of super-atmospheric pressures in the reactions here described introduces a shift in the reaction equilibrium toward the product side of the equation. Furthermore, as previously mentioned, such pressures act to greatly reduce or to eliminate undesirable side reactions with their concomitant loss of reactants and with their resultant increases in final clean-up costs of products and of starting materials. These factors permit and make economically feasible the use of higher reaction temperatures at which the rate of adduction is accelerated still further and the adduct production per unit of time correspondingly increased. Thus, at an applied pressure of 35,000 lbs. per sq. in. and a temperature of 170° C. for 18 hours, the total yield was 65.3 percent of the theoretical, or 3.63 percent per hour; at the same pressures, but with the temperature increased to 200° C., the total yield in only 4 hours was 75.0 percent of the theoretical, or 18.75 percent per hour; and at the same pressure, but at a temperature of 230° C. the yield in only 1 hour was 55.6 percent of the theoretical—and in all these cases no by-products were apparent when the reaction mixture was examined by infra-red spectroscopy.

Similarly, in the case of the Diels-Alder adduction of two moles of hexachlorocyclopentadiene with one mole of anthracene, Danish, Silverman and Tajima (loc. cit.) record a yield of 35 percent of the theoretical by heating the adduction mixture for 20 hours at 160° C. at atmospheric pressure, or a rate of 1.75 percent per hour. We have found that, operating at the same temperature (160° C.) at 35,000 pounds pressure for only 2 hours, the total adduction was 25 percent of the theoretical, or 12.5 percent per hour, despite the very poor mixing of the solid anthracene with the heavier liquid hexachlorocyclopentadiene which was all the apparatus permitted; whereas, operating at atmospheric pressure, which permitted excellent mixing, at 160° C. for the same 2 hour period, the total adduction was 11.0 percent of the theoretical, or 5.5 percent per hour.

The Diels-Alder adduction of 2 moles of hexachlorocyclopentadiene with 1 mole of 2-methylnaphthalene is disclosed by Melvin Look in his co-pending patent application Serial No. 143,049, filed October 5, 1961. Operating at atmospheric pressure and a temperature of 155° C., he obtained a yield after 168 hours (7 days) of 55 percent of the theoretical, or about 0.33 percent per hour. Further experimentation has shown that operating at atmospheric pressure and at 160° C. for 18 hours, the total adduction was only 3.5 percent of the theoretical, or about 0.2 percent per hour. In striking contrast, we have found that, working in the same temperature range of about 155° C.–160° C., but at a pressure of 35,000 pounds per square inch, the total adduction after 18 hours was 28 percent of the theoretical, or about 1.56 percent per hour; and, by operating at the same pressure for the same period of 18 hours, but raising the temperature to 180° C. (which is not feasible at atmospheric pressure because of the dissociation of the adduct), the total yield was increased to 64.3 percent, or about 3.8 percent per hour.

The following table indicates the surprisingly high rates of adduction of hexachlorocyclopentadiene with the aromatic dienophiles shown which have been obtained with the use of typical super-atmospheric pressures alone or in combination with increased temperature. In all cases the theoretical yield of adduct is based on the weight of the aromatic dienophile employed.

| Dienophile | Temp., °C. | Pressure, lbs./sq. in. | Time, Hrs. | Percent Theor. Completion | |
|---|---|---|---|---|---|
| | | | | Total | Per Hour |
| Naphthalene | 150–160 | Atmos. | 120 | 29.6 | 0.25 |
| Do | 150–160 | Atmos. | 200 | 44.0 | 0.22 |
| Do | 160 | 6,000–7,000 | 18 | 13.1 | 0.73 |
| Do | 160 | 15,000 | 18 | 22.9 | 1.23 |
| Do | 160 | 25,000 | 18 | 36.1 | 2.01 |
| Do | 160 | 35,000 | 18 | 45.9 | 2.55 |
| Do | 170 | 35,000 | 18 | 65.3 | 3.63 |
| Do | 200 | 35,000 | 4 | 75.0 | 18.75 |
| Do | 230 | 35,000 | 1 | 55.6 | 55.6 |
| 2-Methylnaphthalene | 160 | Atmos. | 18 | 3.5 | 0.2 |
| Do | 160 | Atmos. | 168 | 55.0 | 0.33 |
| Do | 160 | 35,000 | 18 | 27.9 | 1.55 |
| Do | 180 | 35,000 | 18 | 64.3 | 3.57 |
| 2-Ethylnaphthalene | 160 | Atmos. | 18 | 4.2 | 0.17 |
| Do | 160 | 35,000 | 18 | 50.0 | 2.0 |
| Anthracene | 160 | Atmos. | 2 | 11.0 | 5.5 |
| Do | 160 | Atmos. | 20 | 35.0 | 1.75 |
| Do | 160 | 35,000 | 2 | 25.0 | 12.50 |
| 2-Naphthoic Acid | 200 | 35,000 | 2 | 20.0 | 10.0 |
| Do | 200 | Atmos. | 2 | 0.0 | 0.0 |
| 2-Chloromethylnaphthalene | 140 | Atmos. | 18 | <1.0 | <0.06 |
| Do | 140 | 35,000 | 18 | 9.6 | 0.4 |

The detailed preparation of several of the Diels-Alder adducts of hexachlorocyclopentadiene and aromatic dienophiles listed in the above table is given below to provide a more detailed understanding of the principles and practice of our invention. The examples are obviously not given for purposes of limitation.

EXAMPLE I

*Pressure adduction of hexachlorocyclopentadiene with naphthalene*

A mixture of 3.0 parts by weight of naphthalene and 18.9 parts by weight of hexachlorocyclopentadiene (a molar ratio of 1:3) was warmed until the naphthalene dissolved and was then poured into a glass tube. The tube was placed in an alloy steel pressure vessel, a thermocouple probe was inserted in the adduction mixture, the space above and around the glass tube was filled with water, and the vessel was sealed and placed in a pressure reactor apparatus of standard American Instrument Company design. The unit was then pressured to about 25,000 p.s.i. with a hydraulic pump, using water as the hydraulic liquid. The temperature of the adduction mixture was raised approximately to 160° C. by electrical heaters incorporated in the apparatus, and a pressure of approximately 35,000 pounds per square inch was thus achieved. These temperature and pressure conditions were maintained for 18 hours. At the end of this time the unit was cooled to about 80° C. (i.e., well below the boiling point of water) and the pressure then released. Examination of the adduction mixture by infra-red spectroscopy showed that adduction was about 45.9 percent complete, the product being the adduct of two moles of hexachlorocyclopentadiene and one mole of naphthalene, the same compound obtained by Hyman and Danish in the U.S. Patent No. 2,658,926 and having the structural formula:

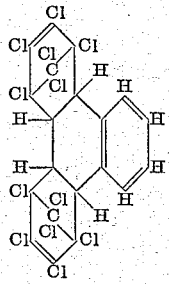

The solid diadduct product which formed as a precipitate was separated and recovered from the reaction mixture by the methods described in the Hyman and Danish patent.

The same procedure described above was employed in preparing at super-atmospheric pressures and other adducts of hexachlorocyclopentadiene and naphthalene listed in the table above, except that the pressures and temperatures were those shown in the table.

EXAMPLE II

*Pressure adduction of hexachlorocyclopentadiene and 2-methylnaphthalene*

A mixture of 3.4 parts by weight of 2-methylnaphthalene and 19.7 parts of hexachlorocyclopentadiene (a molar ratio of 1:3) was warmed until the 2-methylnaphthalene dissolved. This solution was placed in the glass tube of the pressure apparatus described in Example I, the space around and above the tube filled with water, a thermocouple probe inserted, the vessel sealed and placed in the pressure reactor apparatus as in that example. The unit was pressured hydraulically as before, using water as the hydraulic fluid. The temperature of the adduction mixture was raised to 160° C., and a pressure of 35,000 pounds per square inch was achieved. These conditions were maintained for 18 hours. At the end of this time the unit was cooled to about 80° C. and the pressure released. Examination of the adduction mixture by infra-red spectroscopy showed that adduction was about 28 percent complete, and that the adduct consisted of two moles of hexachlorocyclopentadiene fused to one mole of 2-methylnaphthalene and had the structural formula:

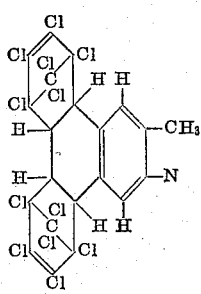

Since this adduct, unlike the DHA of Hyman and Danish, does not precipitate out but remains in solution, it was recovered by the distillation and extraction methods described in the copending application of Melvin Look previously referred to.

EXAMPLE III

*Pressure adduction of hexachlorocyclopentadiene and anthracene*

A mixture of 3.2 parts by weight of anthracene and 14.8 parts of hexachlorocyclopentadiene (a molar ratio of 1:3) was heated to 90° C., stirred, and quickly poured into a heated glass tube. The tube was placed in the pressure vessel described in Example I, and the procedure of this example was followed in all essential respects. The temperature of the adduction mixture was increased to 160° C. and a pressure of 35,000 pounds per square inch was achieved. These conditions were maintained for 2 hours. At the end of this time, the unit was cooled to about 80° C. and the pressure released. Much unreacted anthracene was found floating as a separate layer on the hexachlorocyclopentadiene adduct liquid mixture. Examination of the adduction mixture by infrared spectroscopy showed the adduction to be 25 percent complete, the product being the anthracene-dihexachlorocyclopentadiene adduct described by Hyman and Danish, and having the structural formula:

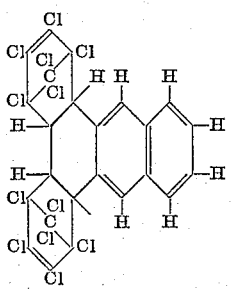

The product was recovered from the adduction mixture by the methods described in the Hyman and Danish patent.

EXAMPLE IV

*Adduction of hexachlorocyclopentadiene and 2-ethylnaphthalene*

This adduction was also disclosed by Look in the copending application previously referred to. The procedure employed in Example II was followed in all respects except that the amounts of 2-methylnaphthalene and hexachlorocyclopentadiene utilized in that example were replaced with 1 part by weight of 2-ethylnaphthalene and 5.24 parts by weight of hexachlorocyclopentadiene (a 1:3 molar ratio). The reaction was carried out at a total pressure of 35,000 pounds per square inch and a temperature of 160° C., these conditions being maintained for 18 hours. At the end of this time, the unit was cooled to 80° C. and the pressure released. Analysis of the adduction liquor by infra-red spectroscopy showed that the yield of the desired adduct of 2 moles of hexachlorocyclopentadiene with 1 mole of 2-ethylnaphthalene was 50 percent complete.

In contrast, another portion of the same starting mixture of reactants, when heated for 18 hours at 160° C. at atmospheric pressure, produced only 4.2 percent of the theoretical yield of adduct, or only one-twelfth that obtained at 35,000 pounds pressure.

EXAMPLE V

*Adduction of hexachlorocyclopentadiene and 2-naphthoic acid*

This adduction was also disclosed by Look in the copending application previously referred to; he reported a small yield of the di-hex-adduct on heating the reaction mixture for 7 days at 150° C.–155° C. The procedure followed in the present example generally was the same as in Example IV, except that the reaction mixture in this case consisted of 1 part by weight of 2-naphthoic acid and 4.8 parts by weight of hexachlorocyclopentadiene (a 1:3 molar ratio). The reaction was carried out at a temperature of 200° C. and a pressure of 35,000 pounds per square inch, these conditions being maintained in this case for only 2 hours. At the end of this time the unit was cooled to 80° C. and the pressure released. Analysis of the adduction liquor by infra-red spectroscopy showed that the yield of the adduct of 2 moles of hexachlorocyclopentadiene with 1 mole of 2-naphthoic acid was 20 percent of the theoretical.

In striking contrast, when another portion of the same starting mixture of reactants was heated for 2 hour at 200° C. at atmospheric pressure, and the adduction liquor examined by infrared spectroscopy, no adduct could be found.

As indicated in the foregoing examples, the external pressure on the adduction mixture was applied hydraulically to a body of water in contact with the adduction mixture, and the total effective pressure was increased by heating the reaction mixture. External pressure may also be applied hydraulically with other appropriate liquids or liquid mixtures, preferably such as are not appreciably soluble in the said adduction mixtures. Or pressure may be applied pneumatically, or directly, or in any desired method. There appears to be no limit to the superatmospheric pressures which may in practice be applied to achieve the reactions here considered. It is also clear that the higher the pressure under which the reaction is carried out, the higher the permissible temperature at which the reaction may be conducted without production of excessive amounts of by-products.

From a consideration of the foregoing discussion and examples it will be obvious that our invention makes possible such far-reaching improvements and economics in the Diels-Alder adductions here involved as to advance greatly the art of commercial production of the adducts. A striking example is the preparation of DHA. As previously noted, when the adduction was carried out at atmospheric pressure for 120 hours at 155° C.–160° C., the total yield of adduct was 29.6 percent of the theoretical or 0.25 percent per hour, and with an appreciable amount of undesired by-products, whereas we have found that, by operating at a pressure of 35,000 pounds per square inch, and a temperature of 230° C., the yield in 1 hour was 55.6 percent, that is, more than 220 times as that recorded by the method heretofore employed, and with the absence of any appreciable amount of by-products. Using the improvements thus made possible by our invention, the volumes of reactants required per unit of production may be reduced by well over 90 percent, the size of the processing equipment may be very greatly decreased, and the cost of operation consequently substantially lessened.

It is evident that the process of our invention is susceptible to many variations and modifications which will suggest themselves to one skilled in the art. Among such variations is a wide choice of aromatic dienophiles other than those named herein, for adduction with hexachlorocyclopentadiene. The ratio of reactants may also be modified. The amount of externally applied pressure and increases in temperature may also be varied widely, the beneficial effect on the rate of adduction varying in a general way with the increases in pressure and temperature over a useful range, although, from the standpoint of effect on practical production, the applied pressure should be at least about 6,000 pounds per square inch and the temperature of the adduction mixture at least about 100° C. Many other procedural steps or conditions may be changed to a greater or less extent. All such modifications are considered as coming within the scope of the invention as limited only by the claims.

We claim:

1. A process for accelerating the rate of production of the Diels-Alder adduction reaction of hexachlorocyclopentadiene with an aromatic dienophile having the capability of forming at least a trace amount of a Diels-Alder adduct with said diene under reaction conditions of atmospheric pressure and a temperature of about 150–155° C., said dienophile being selected from the group consisting of naphthalene, 2-ethylnaphthalene, 2-methylnaphthalene, 2-naphthoic acid, 2-chloromethylnaphthalene, and anthracene, said process comprising applying an exogenous pressure to a mixture of said diene and dienophile and heating said mixture to a temperature of at least about 140° C. and below a temperature at which an appreciable amount of by-products would be produced, said exogenous pressure amounting to at least about 6,000 pounds per square inch.

2. The process of claim 1, said dienophile being naphthalene.

3. The process of claim 1, said dienophile being 2-ethylnaphthalene.

4. The process of claim 1, said dienophile being 2-methylnaphthalene.

5. The process of claim 1, said dienophile being 2-naphthoic acid.

6. The process of claim 1, said dienophile being 2-chloromethylnaphthalene.

7. The process of claim 1, said dienophile being anthracene.

References Cited by the Examiner
UNITED STATES PATENTS 2,658,926  11/53  Hyman et al. _____ 260—649

OTHER REFERENCES

Danish et al.: "J. Am. Chem. Soc.," vol. 76 (1954), pp. 6144–6150.

LEON ZITVER, *Primary Examiner.*

CHARLES B. PARKER, *Examiner.*